United States Patent
Kayser et al.

(10) Patent No.: US 7,022,757 B2
(45) Date of Patent: Apr. 4, 2006

(54) PNEUMATIC TIRE HAVING A RUBBER COMPONENT CONTAINING HIGH IMPACT POLYSTYRENE

(75) Inventors: Francois Kayser, Luxembourg (LU); Wolfgang Lauer, Mersch (LU); Rene Jean Zimmer, Howald (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 637 days.

(21) Appl. No.: 10/079,656

(22) Filed: Feb. 18, 2002

(65) Prior Publication Data

US 2002/0132893 A1 Sep. 19, 2002

Related U.S. Application Data

(60) Provisional application No. 60/276,408, filed on Mar. 15, 2001.

(51) Int. Cl.
*C08K 3/00* (2006.01)
(52) U.S. Cl. .......................... 524/261; 525/70
(58) Field of Classification Search ................ 524/261; 525/70
See application file for complete search history.

(56) References Cited

U.S. PATENT DOCUMENTS

| 4,855,356 A | 8/1989 | Holub et al. ............... 525/66 |
| 5,023,301 A | 6/1991 | Burlett et al. ............... 525/232 |
| 5,367,014 A | 11/1994 | Morehart ..................... 524/526 |
| 5,877,249 A | 3/1999 | Lambotte ..................... 524/493 |
| 6,177,512 B1 | 1/2001 | Gibbons et al. .............. 525/53 |

FOREIGN PATENT DOCUMENTS

| EP | 0716120 | 6/1996 |
| EP | 0831121 | 3/1998 |

OTHER PUBLICATIONS

*Polystyrene and Styrene Copolymers*, pp. 618 and 619 from vol. A21.
*Plastics, General Survey*, pp. 655, 659 and 661 from vol. A20.
European Search Report.

*Primary Examiner*—Edward J. Cain
(74) *Attorney, Agent, or Firm*—John D. DeLong

(57) ABSTRACT

A pneumatic tire having a rubber component where the rubber in said component is comprised of
(A) from 1 to 25 weight percent of high impact polystyrene; and
(B) from 75 to 99 weight percent of a rubber containing olefinic unsaturation.

11 Claims, No Drawings

PNEUMATIC TIRE HAVING A RUBBER COMPONENT CONTAINING HIGH IMPACT POLYSTYRENE

The Applicants hereby incorporate by reference prior U.S. Provisional Application Ser. No. 60/276,408, filed on Mar. 15, 2001.

BACKGROUND OF THE INVENTION

Pneumatic tires have a number of rubber components. Each of these components may require different physical properties. However, one property that is common to almost all rubber components is good tear properties. Conventionally, carbon black may be added to a rubber compound to improve its tear resistance. With increasing amounts of carbon black, other properties of the rubber may be affected. Therefore, there exists a need to improve the tear resistance of a rubber component of a tire without sacrificing other beneficial properties.

SUMMARY OF THE INVENTION

The present invention relates to a pneumatic tire having a rubber component containing high impact polystyrene.

DETAILED DESCRIPTION OF THE INVENTION

There is disclosed a pneumatic tire having a rubber component where the rubber in said component is comprised of
  (A) from 1 to 25 weight percent of high impact polystyrene; and
  (B) from 75 to 99 weight percent of a rubber containing olefinic unsaturation.

The present invention is a pneumatic tire where one of its components contains high impact polystyrene also referred to as HIPS. The amount of HIPS in the component may range from 1 to 25 weight percent of the total rubber in the component. Preferably, from 2 to 10 weight percent of the total rubber in the component is HIPS. HIPS are derived from at least about 90 percent by weight of styrene.

Other monomers which can be copolymerized with the styrene include those of the general formula:

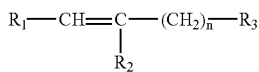

wherein $R_1$ and $R_3$ are selected from the group consisting of hydrogen, halogen, alkyl groups of 1 to 4 carbon atoms, carboalkoxy or $R_1$ and $R_3$ taken together represent an anhydride linkage (—COOOC—) and $R_2$ is selected from hydrogen, vinyl, alkyl or alkenyl groups having from 1 to 12 carbon atoms, cycloalkyl, carboalkoxy, alkoxy-alkyl, alkyl carboxy, ketoxy, halogen, carboxy, cyano or pyridyl and n is 0 or an integer from 1 to 9. Copolymerizable monomers of the above formula include acrylonitrile, methacrylonitrile, acrylic acid, methacrylic acid, maleic anhydride, vinyl chloride, vinylidene chloride, methylmethacrylate, ethyl acrylate, acrylamide, butadiene, isoprene and the like. These additional monomers should not be used in excess of 10 weight percent with no less than 90 weight percent of styrene. It is believed that these functionalities will greatly improve the compatibility with fillers in the rubber of the tires.

The above styrene homopolymers or copolymers are modified by the incorporation of a rubber or elastomeric material. Such an incorporation can be accomplished by blending or graft or block copolymerization with the homopolymer or copolymer derived from the styrene. Suitable rubbers include polymers of aliphatic conjugated dienes such as 1,3-butadiene, isoprene, styrene, methylisoprene as well as ethylene propylene copolymers and EPDM rubber. Polybutadiene and SBR are preferred.

The amount of rubber in the rubber modified vinyl aromatic polymer may range from 1 to 10 percent by weight of the overall HIPS.

The HIPS used in the present invention can be prepared by any of the techniques well known in the art. HIPS are mainly produced by continuous polymerization processes. Solvents such as toluene or ethylbenzene are frequently added in small proportions to provide better control of the polymerization rate, the viscosity of the polymer melt and the cross-linking of the rubber phase. This technique is known as solution polymerization. Typically, such technique involves a pre-polymerization step followed by degassing. Commercialized techniques are utilized by Shell, Monsanto, Mitsui Toatsu, BASF and Dow. Various configurations may include stirred-tank reactors, horizontal plug flow reactors and tower reactors. HIPS for use in the present invention is commercially available from numerous sources.

In addition to the rubber modified vinyl aromatic polymer, from 75 to 99 weight percent of the rubber in the compound is a rubber containing olefinic unsaturation. Preferably, from 90 to 98 weight percent of the total rubber in the component will be the rubber containing olefinic unsaturation. The phrase "rubber or elastomer containing olefinic unsaturation" is intended to exclude HIPS but include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. The rubber containing olefinic unsaturation may be the same or different than used as the rubber in the modified vinyl aromatic polymer. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene.

Additional examples of rubbers which may be used include a carboxylated rubber, silicon-coupled and tin-coupled star-branched polymers. The preferred rubber or elastomers are polybutadiene and SBR.

In one aspect, the second rubber to be combined with the rubber modified vinyl aromatic polymer may be a blend of at least two diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene butadiene rubbers, cis 1,4-polybutadiene rubbers and emulsion polymerization prepared butadiene/acrylonitrile copolymers.

In one aspect of this invention, an emulsion polymerization derived styrene butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

When used in the tire tread, the relatively high styrene content of about 30 to about 45 for the E-SBR can be considered beneficial for a purpose of enhancing traction, or skid resistance. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In addition to the rubber modified vinyl aromatic polymer and rubber containing olefinic unsaturation in the rubberized component of the tire, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm³/100 g.

It may be preferred to have the rubber composition for use in the tire component to optionally contain a conventional sulfur containing organosilicon compound. Examples of suitable sulfur containing organosilicon compounds are of the formula:

Z-Alk-S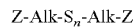-Alk-Z in which Z is selected from the group consisting of

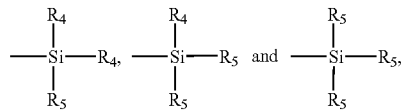

where $R_4$ is an alkyl group of 1 to 4 carbon atoms, cyclohexyl or phenyl; $R_5$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)disulfide, 3,3'-bis(triethoxysilylpropyl)tetrasulfide, 3,3'-bis(triethoxysilylpropyl) octasulfide, 3,3'-bis(trimethoxysilylpropyl)tetrasulfide, 2,2'-bis(triethoxysilylethyl)tetrasulfide, 3,3'-bis (trimethoxysilylpropyl)trisulfide, 3,3'-bis (triethoxysilylpropyl)trisulfide, 3,3'-bis (tributoxysilylpropyl)disulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, 3,3-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl) pentasulfide, 3,3'-bis(tricyclonexoxysilylpropyl)tetrasulfide, 3,3'-bis (tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilyipropyl)tetrasulfide, 3,3'-bis(di t-butylmethoxysilylpropyl)tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl) trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis (triethoxysilylhexyl)tetrasulfide, 12,12'-bis(triisopropoxysilyl dodecyl)disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl)tetrasulfide, 4,4'-bis(trimethoxysilylcyclohexylene)tetrasulfide, 5,5'-bis (dimethoxymethylsilylpentyl)trisulfide, 3,3 '-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis(triethoxysilylpropyl)disulfide and 3,3'-bis(triethoxysilylpropyl)tetrasulfide. Therefore as to the above formula, preferably Z is

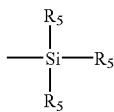

where $R_5$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of the above formula in a rubber composition will vary depending on the level of other additives that are used. Generally speaking, the amount of the compound of the above formula will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1. 5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber compound is mixed in one or more non-productive mix stages. The terms "non-productive" and "productive" mix stages are well known to those having skill in the rubber mixing art. If the rubber composition contains a sulfur-containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition containing the rubber modified vinyl aromatic polymer may be incorporated in a variety of rubber components of the tire. For example, the rubber component may be a tread (including tread cap and tread base), sidewall, apex, chafer, sidewall insert, wirecoat, beadcoat, innerliner and ply coat. Preferably, the compound is the tread.

The pneumatic tire of the present invention may be a passenger tire, motorcycle, aircraft tire, agricultural, earthmover, off-the-road, truck tire, such as light trucks, medium trucks and heavy trucks, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in a sidewall and/or the tread of a tire. As can be appreciated, the tire may be a passenger tire, aircraft tire, truck tire and the like. Preferably, the tire is a passenger tire. The tire may also be a radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component where the rubber in said component is comprised of
   (A) from 1 to 25 weight percent of high impact polystyrene comprising no less than 90 percent by weight of units derived from styrene and not in excess of 10 percent by weight of units derived from a monomer of the formula

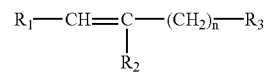

wherein $R_1$ and $R_3$ are selected from the group consisting of hydrogen, halogen, alkyl groups of 1 to 4 carbon atoms, carboalkoxy or $R_1$ and $R_3$ taken together represent an anhydride linkage (—COOOC—) and $R_2$ is selected from hydrogen, vinyl, alkyl or alkenyl groups having from 1 to 12 carbon atoms, cycloalkyl, carboalkoxy, alkoxy-alkyl, alkyl carboxy, ketoxy, halogen, carboxy, cyano or pyridyl and n is 0 or an integer from 1 to 9; and
   (B) from 75 to 99 weight percent of a rubber containing olefinic unsaturation.

2. The pneumatic tire of claim 1 wherein said component is comprised of from 2 to 10 weight percent of high impact polystyrene.

3. The pneumatic tire of claim 2 wherein said high impact polystyrene is modified with polybutadiene.

4. The pneumatic tire of claim 2 wherein said high impact polystyrene is modified with styrene-butadiene rubber.

5. The pneumatic tire of claim 1 wherein said rubber is selected from the group consisting of natural rubber, neoprene, polyisoprene, butyl rubber, halobutyl rubber, polybutadiene, styrene butadiene copolymer, styrene/isoprene/butadiene rubber, methylmethacrylate-butadiene copolymer, isoprene-styrene copolymer, methylmethacrylate-isoprene copolymer, acrylonitrile-isoprene copolymer, acrylonitrile-butadiene copolymer, carboxylated rubber, EPDM, silicon-coupled star-branched polymers, tin-coupled star-branched polymers and mixtures thereof.

6. The pneumatic tire of claim 1 wherein from 0.5 to 20 phr of a sulfur containing organosilicon compound is present and is of the formula:

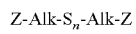

in which Z is selected from the group consisting of

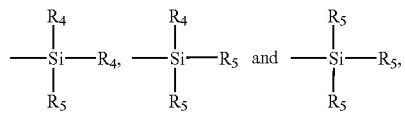

where $R_4$ is an alkyl group of 1 to 4 carbon atoms, cyclohexyl or phenyl; $R_5$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

7. The pneumatic tire of claim 1 wherein said composition is thermomechanically mixed at a rubber temperature in a range of from 140° C. to 190° C. for a total mixing time of from 1 to 20 minutes.

8. The pneumatic tire of claim 1 wherein said tire is selected from the group consisting of passenger tires, motorcycle, aircraft tires, agricultural, earthmover, off-the-road and truck tires.

9. The pneumatic tire of claim 1 where said tire is a radial.

10. A pneumatic tire of claim 1 wherein said rubber component is selected from the group consisting of a tread cap, tread base, sidewall, apex, chafer, sidewall insert, wirecoat, beadcoat, innerliner and ply coat.

11. The pneumatic tire of claim 10 wherein said component is a tread.

* * * * *